(12) United States Patent
Nitta et al.

(10) Patent No.: US 11,736,634 B2
(45) Date of Patent: Aug. 22, 2023

(54) IMAGE FORMING APPARATUS SCANS A DOCUMENT TO EXECUTE AN IMAGE PROCESSING PROCESS AND TO PERFORM PREVIEW PROCESS TO DISPLAY THE PROCESSED DOCUMENT FOR FURTHER PERFORMING THE IMAGE PROCESSING PROCESS BY USER ON THE PREVIEWED DISPLAY DOCUMENT

(71) Applicant: KYOCERA Document Solutions Inc., Osaka (JP)

(72) Inventors: Tsuyoshi Nitta, Osaka (JP); Toshiaki Mutsuo, Osaka (JP)

(73) Assignee: Kyocera Document Solutions, Inc.

( * ) Notice: Subject to any disclaimer, the term of this patent is extended or adjusted under 35 U.S.C. 154(b) by 0 days.

(21) Appl. No.: 17/727,302

(22) Filed: Apr. 22, 2022

(65) Prior Publication Data
US 2022/0360675 A1 Nov. 10, 2022

(30) Foreign Application Priority Data
May 10, 2021 (JP) .................. 2021-079472

(51) Int. Cl.
*H04N 1/00* (2006.01)
*H04N 1/32* (2006.01)
(Continued)

(52) U.S. Cl.
CPC ..... *H04N 1/00458* (2013.01); *H04N 1/00411* (2013.01); *G06K 15/1885* (2013.01); *G06V 10/759* (2022.01); *G06V 30/418* (2022.01); *H04N 1/00087* (2013.01); *H04N 1/00474* (2013.01); *H04N 1/32507* (2013.01); *H04N 1/3876* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,233,201 B2* | 7/2012 | Toyoda | H04N 1/00748 358/488 |
| 2003/0048487 A1* | 3/2003 | Johnston | H04N 1/0402 358/474 |

(Continued)

FOREIGN PATENT DOCUMENTS

JP 2016-010094 1/2016

*Primary Examiner* — Haris Sabah

(57) ABSTRACT

An image scanning device scans one or plural document images of one or plural predetermined head pages, and a preview processing unit performs preview display of the document image(s) of the head page(s). After detecting a user operation to accept the document image on the preview display, the image scanning device scans a document image of a subsequent page to the head page(s), and the image processing unit performs the image process for the document image of the subsequent page. Further, the image processing unit performs a part or whole of the image process for the document image(s) of the head page(s) before the preview display. If a part of the image process is displayed before the preview display, the image processing unit performs a remaining part of the image process after detecting a user operation to accept the document image on the preview display.

3 Claims, 3 Drawing Sheets

(51) Int. Cl.
 *H04N 1/387* (2006.01)
 *G06V 30/418* (2022.01)
 *G06K 15/02* (2006.01)
 *G06V 10/75* (2022.01)

(56) References Cited

U.S. PATENT DOCUMENTS

2007/0146819 A1* 6/2007 Kai .................... H04N 1/00827
 358/453
2010/0141991 A1* 6/2010 Yoshida ............... H04N 1/3878
 358/1.18
2015/0009520 A1* 1/2015 Yamada ................ H04N 1/387
 358/1.14

* cited by examiner

IMAGE FORMING APPARATUS SCANS A DOCUMENT TO EXECUTE AN IMAGE PROCESSING PROCESS AND TO PERFORM PREVIEW PROCESS TO DISPLAY THE PROCESSED DOCUMENT FOR FURTHER PERFORMING THE IMAGE PROCESSING PROCESS BY USER ON THE PREVIEWED DISPLAY DOCUMENT

CROSS-REFERENCE TO RELATED APPLICATIONS

This application relates to and claims priority rights from Japanese Patent Application No. 2021-079472, filed on May 10, 2021, the entire disclosures of which are hereby incorporated by reference herein.

BACKGROUND

1. Field of the Present Disclosure

The present disclosure relates to an image forming apparatus.

2. Description of the Related Art

An multi function peripheral scans a document image, generates and displays a preview image of the scanned image, and further displays a processed preview image obtained by performing an image process for the preview image.

The aforementioned multi function peripheral generates and displays in turn preview images corresponding to document images of plural pages, and therefore requires a relatively large capacity of a storage device for storing image data of the document images and the preview images of the plural pages.

SUMMARY

An image forming apparatus according to an aspect of the present disclosure includes an image scanning device, an image processing unit, an input device, a display device, a preview processing unit, and a control unit. The image scanning device is configured to scan a document image of a document. The image processing unit is configured to perform an image process for the document image scanned by the image scanning device. The input device is configured to detect a user operation. The preview processing unit is configured to perform preview display using the display device. The control unit is configured to output the document image using an output device after the image processing unit performs the image process for the document image. The image scanning device scans one or plural document images of one or plural predetermined head pages, and the preview processing unit performs preview display of the one or plural document images of the one or plural predetermined head pages. After the input device detects a user operation to accept the document image on the preview display, (a) the image scanning device scans a document image of a subsequent page to the one or plural predetermined head pages, and (b) the image processing unit performs the image process for the document image of the subsequent page. Further, the image processing unit (a) performs a part or whole of the image process for the one or plural document images of the one or plural predetermined head pages before the preview display, and (b) if the image processing unit performs a part of the image process before the preview display, performs a remaining part of the image process after the input device detects a user operation to accept the document image on the preview display.

These and other objects, features and advantages of the present disclosure will become more apparent upon reading of the following detailed description along with the accompanied drawings.

DETAILED DESCRIPTION

Hereinafter, embodiments according to an aspect of the present disclosure will be explained with reference to drawings.

Embodiment 1

Figure 1:
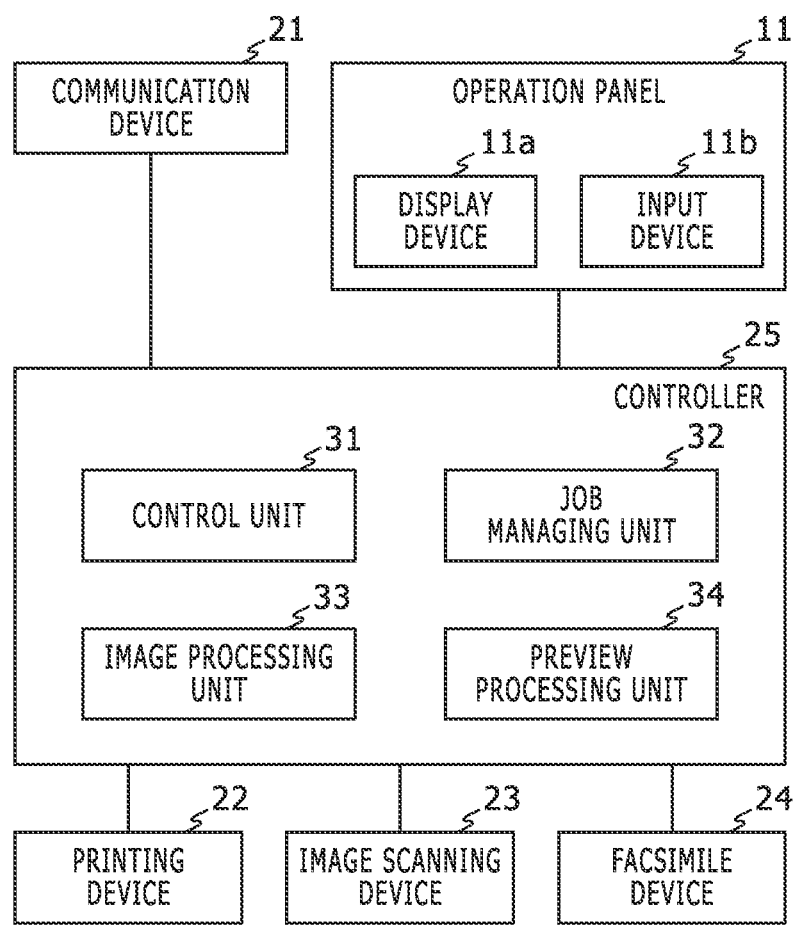
FIG. 1 shows a block diagram that indicates a configuration of an image forming apparatus according to an embodiment of the present disclosure.

FIG. 1 shows a block diagram that indicates a configuration of an image forming apparatus according to an embodiment of the present disclosure.

The image forming apparatus shown in FIG. 1 is a multi function peripheral having a printing function, an image scanning function and a facsimile function, and includes an operation panel 11, a communication device 21, a printing device 22, an image scanning device 23, a facsimile device 24, and a controller 25.

The operation panel 11 includes a display device 11a such as a liquid crystal display and an input device 11b such as a touch panel, and the display device 11a displays an operation screen for a user and the input device 11b detects a user operation.

Further, the communication device 21 is an internal device capable of connecting through a network or the like to an unshown host device and performing data communication in accordance with a predetermined communication protocol.

Furthermore, the printing device 22 is an internal device that prints a document image on a printing paper sheet, for example, in an electrophotographic manner.

Furthermore, the image scanning device 23 is an internal device that optically scans a document image from a document, and generates image data of the document image. The image scanning device 23 includes an auto document feeder, for example, and scans a document page page by page in turn from a document of plural pages put on the auto document feeder.

Furthermore, the facsimile device 24 is an internal device that has a receiving function that receives a facsimile signal and converts the facsimile signal to image data and a transmitting function that converts image data to a facsimile signal and transmits the facsimile signal.

Furthermore, the controller 25 includes a computer that includes a CPU (Central Processing Unit), a ROM (Read Only Memory), a RAM (Random Access Memory) and the like (not shown), loads a program stored in the ROM or the like to the RAM, and executes the program with the CPU and thereby acts as various processing units.

In this embodiment, the controller 25 acts as a control unit 31, a job managing unit 32, an image processing unit 33, and a preview processing unit 34.

The control unit 31 controls the aforementioned internal devices and thereby performs sorts of jobs such as copy job, scan-to-send job, and facsimile transmission job, and performs a user interface process using the operation panel 11. Specifically, the control unit 31 displays an operation screen on the display device 11a in the operation panel 11, detects a user operation to the operation screen using the input device 11b in the operation panel 11, and changes the operation screen in accordance with the detected user operation.

In particular, the control unit 31 outputs the document image after the image processing unit 33 performs an image process using an output device (such as the print device 22, the facsimile device 24, the communication device 21 or the like; i.e. an output device corresponding to a job specified by a job request).

The job managing unit 32 receives a job request based on a user operation detected by the input device 11b and a job request received from an external device by the communication device 21, and causes the control unit 31 to perform a job specified by the job request. The job request includes a job setting such as image quality setting.

The image processing unit 33 performs sorts of image processes for the document image scanned by the image scanning device 23. Specifically, the image processing unit 33 performs (a) an input image process (shading correction, color correction, gamma correction, and/or the like) corresponding to an input device (i.e. the image scanning device 23), (b) a preference image process to match the document image with a user preference, and (c) an output image process (image quality adjustment and/or the like) corresponding to an output device (the printing device 22, the communication device 21 (i.e. a device for sending a data file in a send-to-scan job or the like), or the facsimile device 24 (i.e. a device for facsimile transmission)). The aforementioned RAM is used as a work memory for these image processes.

In the preference image process, a gradation adjustment, a spatial filter process and/or the like is/are performed using an existent method in accordance with values preset for each user to plural image quality parameters.

The preview processing unit 34 performs preview display of the document image using the display device 11a after a specific image process. Specifically, the preview processing unit 34 performs zooming of the document image after the specific image process and thereby generates a preview image and displays the preview image on the display device 11a.

In Embodiment 1, a document of plural pages is set on the image scanning device 23, and upon detecting a user operation for starting a job by the input device 11b, the job managing unit 32 uses the control unit 31 and thereby causes the image scanning device 23, the image processing unit 33, and the preview processing unit 34 to act as follows.

Firstly, the image scanning device 23 scans one or plural document images of one or plural predetermined head pages, and the preview processing unit 34 performs preview display of the document image(s) of the predetermined head page(s). After the input device 11b detects a user operation to accept the document image on the preview display, (a) the image scanning device 23 scans a document image of a subsequent page to the predetermined head page(s), and (b) the image processing unit 33 performs the image process for the document image of the subsequent page.

Specifically, the image processing unit 33 performs a part or whole of the image process for the document image(s) of the predetermined head page(s) before the preview display; and if the image processing unit 33 performs a part of the image process before the preview display, the image processing unit 33 performs a remaining part of the image process after the input device 11b detects a user operation to accept the document image on the preview display.

In Embodiment 1, a relatively small capacity non-volatile storage device (hard disk drive, SSD (Solid State Drive), flash memory, or the like) may be built in (i.e. this non-volatile storage device has a capacity that can store image data of the aforementioned predetermined page(s) but can not store image data of more pages than the aforementioned predetermined page(s)). Further, in Embodiment 1, image data of the document image(s) scanned by the image scanning device is stored in a predetermined storage device (the aforementioned non-volatile storage device or the aforementioned RAM), the image processing unit 33 performs a preference image process to match the document image with a user preference for the document image scanned by image scanning device 23, and the preview processing unit 34 displays the document image(s) of the head page(s) after the preference image process on the display device 11a as the preview display. Specifically, a preview image is generated by zooming of the document image after the specific image process, and displayed on the display device 11a.

Afterward, in Embodiment 1, after the input device 11b detects a user operation to accept the document image on the preview display, (a) the image processing unit 33 performs an output image process for the document image(s) of the head page(s), (b) the image scanning device 23 scans a document image of a subsequent page to the head page(s), and (c) the image processing unit 33 performs the preference image process and the output image process for the document image of the subsequent page.

Further, in Embodiment 1, if the input device 11b detects a user operation not to accept the document image on the preview display, (a) the input device 11b afterward detects a user operation to reset an image process characteristic, (b) the image processing unit 33 reads from the aforementioned storage device the image data of the document image(s) of the head page(s) (i.e. document image(s) that the preference image process has not been performed for) and performs the image process (here, the output image process) with the reset image process characteristic for the document image(s) of the head page(s) based on the read image data, (c) the image scanning device 23 scans the document image of the subsequent page, and (d) the image processing unit 33 performs the image process (here, the output image process) with the reset image process characteristic for the document image of the subsequent page.

It should be noted that when acquiring the document image(s) from the image scanning device 23, the image processing unit 33 performs the input image process corresponding to the image scanning device 23 for the document image(s). Therefore, in Embodiment 1, the image data of the document image(s) after the input image process is stored in the aforementioned storage device, and this image data is read from the aforementioned storage device and then the subsequent process is performed.

Figure 2:
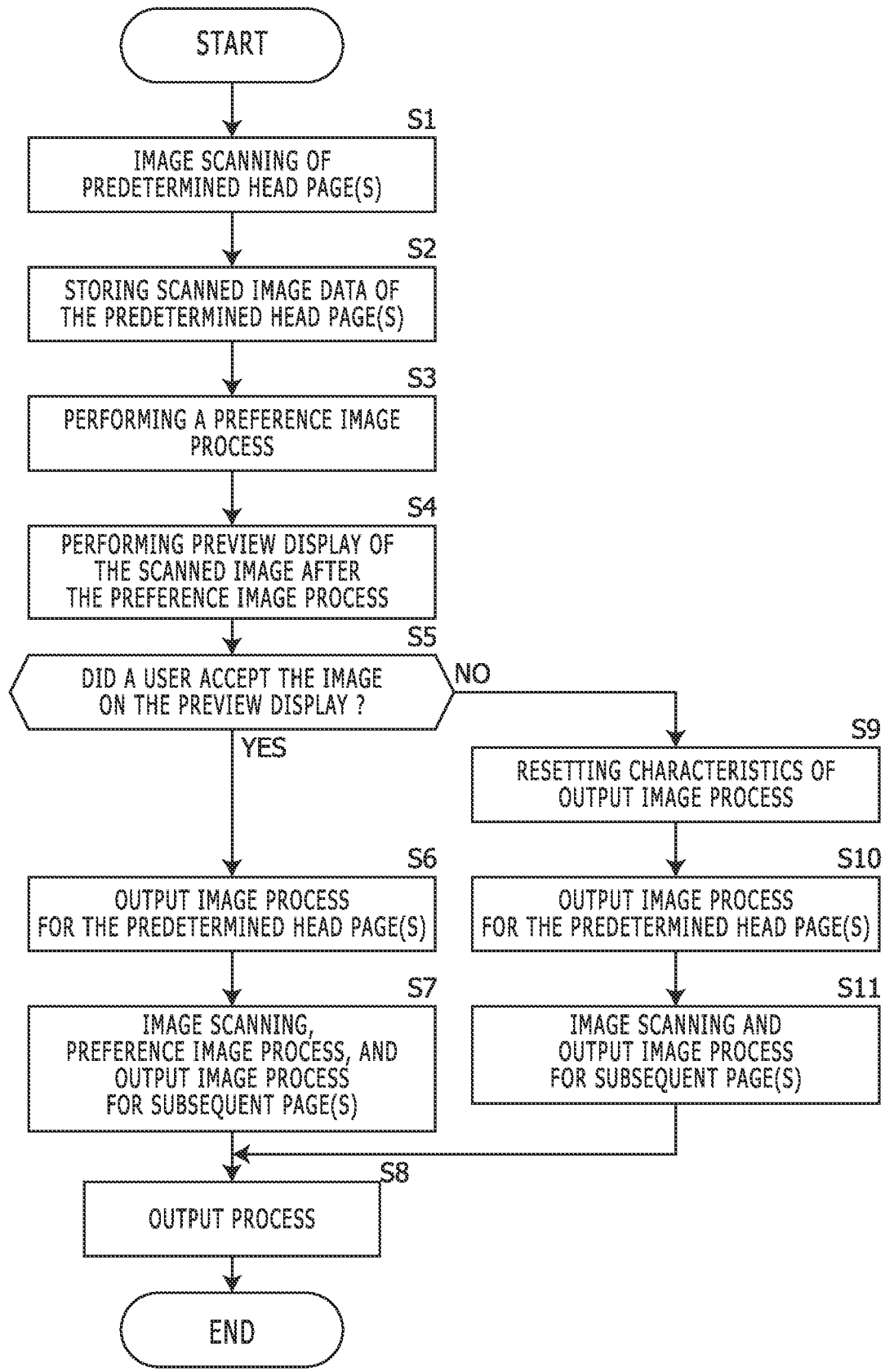
FIG. 2 shows a flowchart that shows a behavior of the image forming apparatus in Embodiment 1.

The following part explains a behavior of the image forming apparatus in Embodiment 1. FIG. 2 shows a flowchart that shows a behavior of the image forming apparatus in Embodiment 1.

A user logs in this image forming apparatus, sets a document of plural pages on the image scanning device 23, performs to the input device 11*b* a user operation for a job request of a copy job, a facsimile transmission job, a scan-to-send job or the like (including for a job setting), and then performs to the input device 11*b* a user operation for starting the job.

When the aforementioned user operations are detected by the input device 11*b*, the job managing unit 32 causes the control unit 31 to perform image scanning of one or plural predetermined head pages (e.g. one page or two pages) (in Step S1). In this process, the control unit 31 causes the image scanning device 23 to perform the image scanning of the head page(s), and acquires image data of one or plural document images of the head page(s); and the image processing unit 33 performs the input image process for the document image(s) of the head page(s), and stores the image data of the document image(s) after the input image process in the aforementioned storage device (in Step S2).

Subsequently, the image processing unit 33 reads the image data, and performs the preference image process for the document image(s) of the head page(s) based on the image data (in Step S3). Here, the user is identified through a user authentication process when the user logged in, and the preference image process corresponding to the identified user is performed. The image data in the storage device is never renewed with the image data after the preference image process.

Subsequently, the preview processing unit 34 generates a preview image of the document image(s) after the preference image process and display the preview image on the display device 11*a* (in Step S4).

For example, a key to accept the document image(s) after this preference image process and a key not to accept the document image(s) after this preference image process (e.g. OK key and CANCEL key) are displayed with this preview image, and the user operates any one of these keys.

The job managing unit 32 determines whether the user accepts the document image(s) on the preview display or not (in Step S5). For example, an operation to the aforementioned key is detected by the input device 11*b*, and in accordance with the operated key, the job managing unit 32 determines whether the user accepts the document image(s) on the preview display or not.

If it is determined that the document image(s) on the preview display is/are accepted, the image processing unit 33 performs the output image process for the document image(s) of the head page(s) (in Step S6). For subsequent pages until the last page, page by page, the image scanning device 23 performs the image scanning and the image processing unit 33 performs the preference image process and the output image process (in Step S7).

After performing the preference image process and the output image process for all pages as mentioned, the control unit 31 performs an output process (printing, facsimile transmission, transmission of an image data file, or the like) for the document image(s) obtained through these image processes (in Step S8).

Contrarily, in Step S5, if it is determined that the document image(s) on the preview display is/are not accepted (i.e. is/are denied), the job managing unit 32 receives a user operation inputted to the input device 11*b* to reset an image process characteristic, using the control unit 31 (in Step S9), the image processing unit 33 performs the output image process for the head page(s) with the reset image process characteristic (image quality characteristic, gradation characteristic, and/or the like) (in Step S10), and for subsequent pages until the last page, page by page, the image scanning unit 23 performs the image scanning and the image processing unit 33 performs the output image process with the reset image process characteristic (in Step S11).

After performing the preference image process and the output image process for all pages as mentioned, the control unit 31 performs an output process (printing, facsimile transmission, transmission of an image data file, or the like) for the document image(s) obtained through these image processes (in Step S8).

As mentioned, in Embodiment 1, the image scanning device scans one or plural document images of one or plural predetermined head pages, and the preview processing unit 34 performs preview display of the document image(s) of the predetermined head page(s). After the input device 11*b* detects a user operation to accept the document image on the preview display, (a) the image scanning device 23 scans a document image of a subsequent page to the predetermined head page(s), and (b) the image processing unit 33 performs the image process for the document image(s) of the subsequent page. Further, the image processing unit 33 (*a*) performs a part or whole of the image process for the document image(s) of the predetermined head page(s) before the aforementioned preview display; and (b) if the image processing unit 33 performs a part of the image process before the preview display, the image processing unit 33 performs the remaining part of the image process after the input device lib detects a user operation to accept the document image on the preview display.

Consequently, the preview display can be performed of the document image(s) obtained by an image process to match the document image(s) with a user preference using a relatively small capacity storage device (RAM or the like) (in a device in a low-cost range that does not includes a large capacity HDD, for example) because the subsequent pages are processed after a user evaluates (i.e. accepts or denies) the preview display of predetermined head page(s).

Further, even if the document image(s) on the preview display is/are not accepted, it is not required for the user to set the document on the image scanning device 23 again, and consequently, high usability is provided, because the image data of the predetermined head page(s) (i.e. the image data that the preference image process and the output image process have not been performed for) is stored in a storage device.

Embodiment 2

In Embodiment 2, the aforementioned RAM is used as a work memory, and the image processing unit 33 and the preview processing unit 34 act as mentioned below, without storing the image data of the document image(s) in the storage device as mentioned in Embodiment 1.

In Embodiment 2, the image processing unit 33 performs the preference image process and the output image process for the document image scanned by the image scanning device 23 (here, the document image after the input image process), and the preview processing unit 34 displays the document image(s) of the head page(s) after the preference image process and the output image process on the display device 11*a* as the preview display.

Further, in Embodiment 2, after the input device 11*b* detects a user operation to accept the document image on the preview display, (a) the image scanning device 23 scans a document image of a subsequent page to the predetermined head page(s), and (b) the image processing unit 33 performs the preference image process and the output image process for the document image of the subsequent page.

Furthermore, in Embodiment 2, if the input device 11b detects a user operation not to accept the document image on the preview display, (a) the input device 11b afterward detects a user operation to reset an image process characteristic, and (b) page by page of all pages of the document, the image scanning device 23 scans the document image and the image processing unit 33 performs the image process with the reset image process characteristic.

Figure 3:
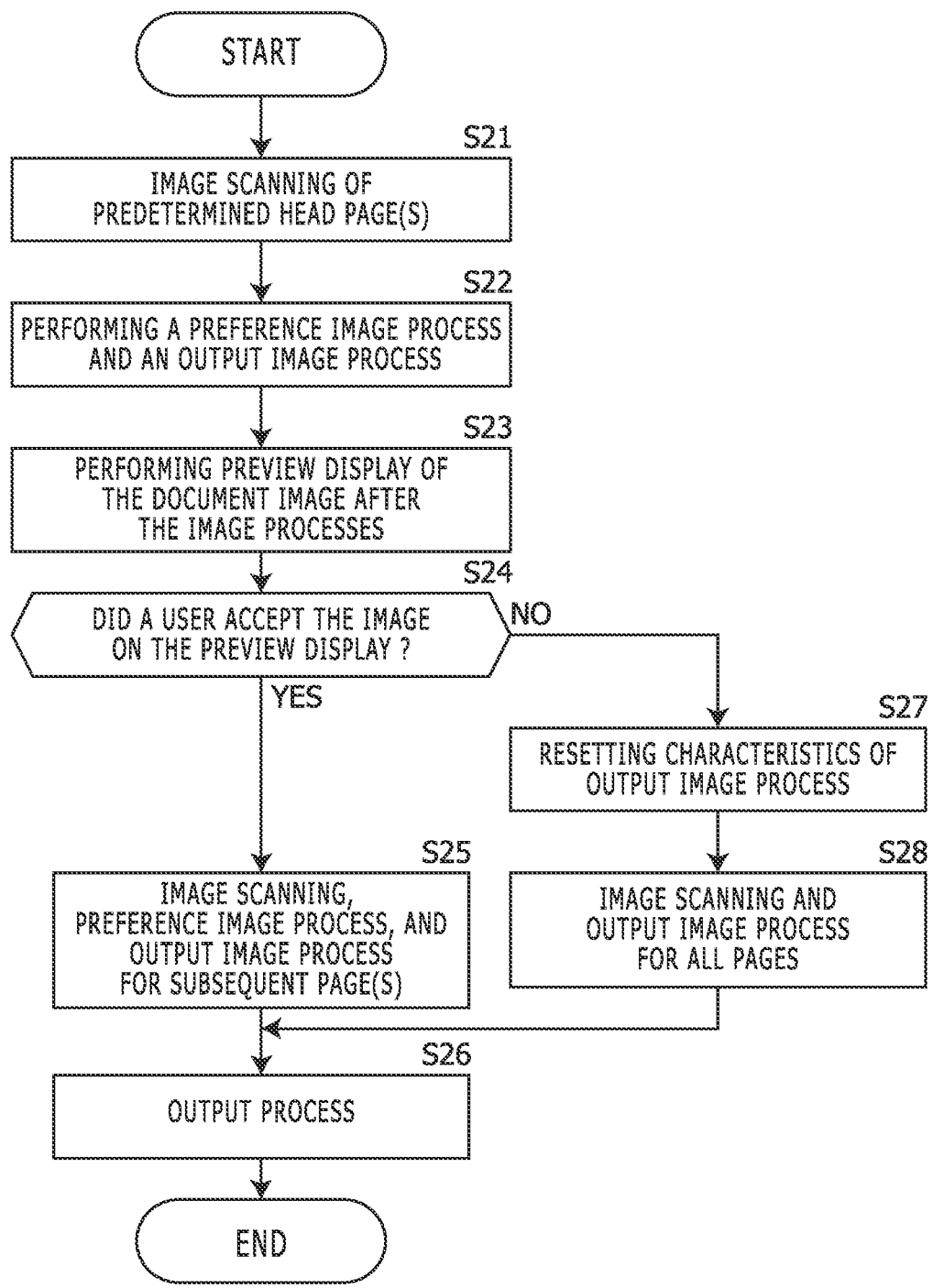
FIG. 3 shows a flowchart that shows a behavior of the image forming apparatus in Embodiment 2.

The following part explains a behavior of the image forming apparatus in Embodiment 2. FIG. 3 shows a flowchart that shows a behavior of the image forming apparatus in Embodiment 2.

As well as in Embodiment 1, a user logs in this image forming apparatus, sets a document of plural pages on the image scanning device 23, performs to the input device 11b a user operation for a job request of a copy job, a facsimile transmission job, a scan-to-send job or the like (including for a job setting), and then performs to the input device 11b a user operation for starting the job.

When the aforementioned user operations are detected by the input device 11b, the job managing unit 32 causes the control unit 31 to perform image scanning of one or plural predetermined head pages (e.g. one page or two pages) (in Step S21).

In this process, the control unit 31 causes the image scanning device 23 to perform the image scanning of the predetermined head page(s), and acquires image data of one or plural document images of the head page(s); and the image processing unit 33 performs the input image process, the preference image process and the output image process for the document image(s) of the head page(s) (in Step S22). In this embodiment, the image data after these image processes are maintained in the work memory.

Subsequently, the preview processing unit 34 generates a preview image of the document image(s) after the preference image process and the output image process, and displays the preview image on the display device 11a (in Step S23).

The job managing unit 32 determines whether the user accepts the document image(s) on the preview display or not (in Step S24).

If it is determined that the document image(s) on the preview display is/are accepted, then for subsequent pages until the last page, page by page, the image scanning device 23 performs the image scanning and the image processing unit 33 performs the preference image process and the output image process (in Step S25).

After performing the preference image process and the output image process for all pages as mentioned, the control unit 31 performs an output process (printing, facsimile transmission, transmission of an image data file, or the like) for the document image(s) obtained through these image processes (in Step S26).

Contrarily, in Step S24, if it is determined that the document image(s) on the preview display is/are not accepted (i.e. is/are denied), then the user sets the document (including all the pages) on the image scanning device 23 again, the job managing unit 32 receives a user operation inputted to the input device 11b to reset an image process characteristic, using the control unit 31 (in Step S27), and for subsequent pages until the last page, page by page, the image scanning unit 23 performs the image scanning and the image processing unit 33 performs the output image process with the reset image process characteristic (in Step S28).

After performing the preference image process and the output image process for all pages as mentioned, the control unit 31 performs an output process (printing, facsimile transmission, transmission of an image data file, or the like) for the document image(s) obtained through these image processes (in Step S26).

Other parts of the configuration and behaviors of the image forming apparatus in Embodiment 2 are identical or similar to those in Embodiment 1, and therefore not explained here.

As mentioned, in Embodiment 2, the preference image process and the output image process are performed together for the predetermined head page(s), and consequently, if the document image(s) on the preview display is/are accepted, the job is performed in a relatively short time.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image forming apparatus, comprising:
an image scanning device configured to scan a document image of a document;
an image processing unit configured to perform an image process for the document image scanned by the image scanning device;
an input device configured to detect a user operation;
a display device;
a storage device; configured to store image data of the document image scanned by the image scanning device;
a preview processing unit configured to perform preview display using the display device; and
a control unit configured to output the document image using an output device after the image processing unit performs the image process for the document image;
wherein the image scanning device scans one or plural document images of one or plural predetermined head pages; wherein the one or plural document images of the one or plural predetermined head pages is stored in the storage device;
the image processing unit performs a preference image process to the one or plural document images of one or plural predetermined head pages scanned by image scanning device in order to match the document image with a user preference;
the preview processing unit displays the one or plural document images of the one or plural head pages after the preference image process on the display device as the preview display;
wherein if the input device detects a user operation to accept the document image on the preview display, (a) the image processing unit performs an output image process for the one or plural displayed document images that had already been through the preference image process; (b) the image scanning device scans a document image of a subsequent page to the one or plural predetermined head pages, and (c) the image processing unit performs the preference image process and the output image process for the document image of the subsequent page; and
wherein if the input device detects a user operation not to accept the document image on the preview display, (d) the input device detects a user operation to reset an image process characteristic, (e) the image processing unit reads from the storage device the image data of the one or plural document images of the one or plural head pages and performs the image process with the reset image process characteristic for the one or plural document images of the one or plural head pages based on the read image data, (f) the image scanning device scans the document image of the subsequent page, and (d) the image processing unit performs the image process with the reset image process characteristic for the document image of the subsequent page.

2. The image forming apparatus according to claim 1, wherein the relationship data indicates a user group of users who work physically closely to each other; and the job managing unit (a) determines whether the sender user is a user who works physically closely to the user who is physically directly using the image forming apparatus or not on the basis of the relationship data, and (b1) if it is determined that the sender user is not a user who works physically closely to the user who is physically directly using the image forming apparatus, determines that the print job request should be refused and (b2) if it is determined that the sender user is a user who works physically closely to the user who is physically directly using the image forming apparatus, determines that the print job request should not be refused.

3. An image scanning device configured to scan a document image of a document;

an image processing unit configured to perform an image process for the document image scanned by the image scanning device;

an input device configured to detect a user operation;

a display device;

a storage device; configured to store image data;

a preview processing unit configured to perform preview display using the display device; and a control unit configured to output the document image using an output device after the image processing unit performs the image process for the document image;

wherein the image scanning device scans one or plural document images of one or plural predetermined head pages;

wherein the image processing unit performs a preference image process to the one or plural predetermined head pages scanned by image scanning device in order to match the document image with a user preference and an output image process corresponding to the output device; wherein the processed one or plural document images of one or plural predetermined head pages is stored in the storage device;

the preview processing unit displays the one or plural document images of the one or plural head pages after the preference image process and the output image process on the display device as the preview display; and wherein if the input device detects a user operation to accept the document image on the preview display, (a) the image scanning device scans a document image of a subsequent page to the one or plural predetermined head pages, (b) the image processing unit performs the preference image process and the output image process for the document image of the subsequent page and (c) the control unit will output the stored processed one or plural document images of one or plural predetermined head pages and the scanned and processed document images of the subsequent pages; and wherein if the input device detects a user operation not to accept the document image on the preview display, (d) the input device detects a user operation to reset an image process characteristic, (e) the image scanning device scans the document image of all pages of the document and (f) the image processing unit performs the image process with the reset image process characteristic.

* * * * *